(12) United States Patent
Chun

(10) Patent No.: US 11,391,580 B2
(45) Date of Patent: Jul. 19, 2022

(54) SYSTEM HAVING UNMANNED AERIAL VEHICLE AND COOPERATION METHOD THEREOF

(71) Applicants: Hyundai Motor Company, Seoul (KR); Kia Motors Corporation, Seoul (KR)

(72) Inventor: Chang Woo Chun, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 166 days.

(21) Appl. No.: 16/534,599

(22) Filed: Aug. 7, 2019

(65) Prior Publication Data

US 2020/0191581 A1    Jun. 18, 2020

(30) Foreign Application Priority Data

Dec. 18, 2018  (KR) .................. 10-2018-0163887

(51) Int. Cl.
| | |
|---|---|
| *G01C 21/34* | (2006.01) |
| *G08G 5/00* | (2006.01) |
| *B60L 53/65* | (2019.01) |
| *B64C 39/02* | (2006.01) |

(52) U.S. Cl.
CPC .......... *G01C 21/3407* (2013.01); *B60L 53/65* (2019.02); *B64C 39/024* (2013.01); *G01C 21/3453* (2013.01); *G08G 5/003* (2013.01); *G08G 5/0069* (2013.01); *B64C 2201/128* (2013.01); *B64C 2201/208* (2013.01)

(58) Field of Classification Search
CPC ............ G01C 21/3407; G01C 21/3453; G08G 5/003; G08G 5/0069; B60L 53/65; B64C 39/024; B64C 2201/128; B64C 2201/208
See application file for complete search history.

(56) References Cited

U.S. PATENT DOCUMENTS

| | | | |
|---|---|---|---|
| 9,809,305 B2* | 11/2017 | Buchmueller | G08G 5/0013 |
| 2015/0006072 A1* | 1/2015 | Goldberg | G06Q 50/30 |
| | | | 705/5 |
| 2016/0196756 A1* | 7/2016 | Prakash | G08G 5/025 |
| | | | 701/3 |
| 2016/0378108 A1* | 12/2016 | Paczan | B64D 31/06 |
| | | | 705/330 |
| 2017/0160735 A1* | 6/2017 | Mikan | G08G 1/205 |
| 2017/0316701 A1* | 11/2017 | Gil | G08G 5/0069 |
| 2018/0096609 A1* | 4/2018 | de la Cruz | G08G 5/0034 |
| 2019/0080373 A1* | 3/2019 | Takoshima | G06Q 10/04 |

* cited by examiner

*Primary Examiner* — Jelani A Smith
*Assistant Examiner* — Frank T Glenn, III
(74) *Attorney, Agent, or Firm* — Fox Rothschild LLP

(57) ABSTRACT

A system includes a plurality of vehicles and an unmanned aerial vehicle (UAV) configured to land on one of the vehicles and travel together with the vehicle. A control center selects one of the vehicles on which landing of the UAV is performed based on travel routes transmitted by the vehicles and the UAV, and transmit a cooperation request to the selected vehicle.

15 Claims, 10 Drawing Sheets

FIG. 7

| COOPERATION ROUTE | FLIGHT ROUTE | VEHICLE HITCHHIKE ROUTE | COOPERATIVE VEHICLE | FLIGHT DISTANCE | NUMBER OF TRANSFERS | REQUIRED TIME | RESULT |
|---|---|---|---|---|---|---|---|
| 0 | DIRECT FLIGHT | - | - | 12km | 0 | 14.4 | |
| 1 | 1 | 8km | F | 4km | 1 | 11.4 | MINIMUM TIME MINIMUM TRANSFER |
| 2 | 1 | 4km | G | 8km | 1 | 13.4 | |
| 3 | 1 | 12km | D,F | 2km | 2 | 12.8 | COMPLEX OPTIMUM ROUTE |
| 4 | 2 | 4km | G | 10km | 1 | 15.8 | |
| 5 | 2 | 6km | K | 8km | 1 | 14.8 | |
| 6 | 2 | 10km | G,K | 4km | 2 | 13.8 | |
| 7 | 3 | 12km | L | 6km | 1 | 16.6 | |
| 8 | 3 | 4km | M | 14km | 1 | 20.6 | |
| 9 | 3 | 16km | M,L | 1km | 2 | 14.4 | |

SYSTEM HAVING UNMANNED AERIAL VEHICLE AND COOPERATION METHOD THEREOF

CROSS-REFERENCE TO RELATED APPLICATION

This application is based on and claims priority under 35 U.S.C. § 119 to Korean Patent Application No. 10-2018-0163887, filed on Dec. 18, 2018, the disclosure of which is incorporated herein by reference.

BACKGROUND

1. Field of the Disclosure

The prevent disclosure relates to a cooperation method performed between an unmanned aerial vehicle (UAV) and a vehicle while the vehicle being driven, and more particularly, to a method of selecting a vehicle on which the UAV is to land based on travel routes transmitted by the vehicle and the UAV.

2. Description of the Related Art

Recently, unmanned aerial vehicles (UAV) capable of flight and image capturing have been developed and used. Generally, a UAV flown and controlled by radio wave guidance and having a rotary wing is referred to as a drone. Drones have recently been used in a variety of applications, such as photography at a high space, delivery, and the like, and research regarding the drones is being actively conducted.

SUMMARY

Therefore, present disclosure provides a system having a UAV capable of improving limitations in travelling only by a UAV and coming into wide applications in various industries by enabling cooperation between a UAV and a vehicle, and a cooperation method thereof. Additional aspects of the invention will be set forth in part in the description which follows and, in part, will be obvious from the description, or may be learned by practice of the invention.

Therefore, the present invention provides a system that may include: a vehicle; an unmanned aerial vehicle (UAV) configured to land on the vehicle and travel together with the vehicle; and a control center configured to select the vehicle on which landing of the UAV is to be performed based on travel routes transmitted by the vehicle and the UAV, and transmit a cooperation request to the vehicle.

The control center may be configured to determine whether landing of the UAV is to be performed, based on an approval of the cooperation request. The control center may then be configured to provide the vehicle or the UAV with a reward based on a cooperation completion transmitted by the UAV and the vehicle. Additionally, the control center may be configured to search for a plurality of travel routes based on information regarding a departure and a destination of the UAV. The control center may be configured to determine a plurality of vehicle hitchhike routes the plurality of travel routes and the travel route transmitted by the vehicle.

Further, the control center may be configured to generate a cooperation route based on an approval of the cooperation request that is received from a vehicle included in the plurality of vehicle hitchhike routes. The control center may then be configured to calculate a required time based on at least one of the vehicle hitchhike route included in the cooperation route, a flight time of the UAV, and a number of transfers. The control center may be configured to set an order of priority to each of the cooperation routes based on the calculated required time and the number of transfers. Additionally, the control center may be configured to set an order of priority to each of the cooperation routes based on the calculated required time and a predetermined error range. The UAV may land on the vehicle and charge a battery provided in the vehicle.

It is another aspect of the present invention, a cooperation method of a system including a vehicle, a unmanned aerial vehicle (UAV) landing on the vehicle and moving together with the vehicle, and a control center performing communication with the vehicle and the UAV may include: selecting a vehicle on which landing of the UAV is to be performed based on travel routes transmitted by the vehicle and the UAV; and transmitting, by the control center, a cooperation request to the vehicle or the vehicle.

The cooperation method may further include determining whether to perform landing of the UAV based on an approval of the cooperation request. Additionally, the cooperation method may include providing the vehicle or the UAV with a reward based on a cooperation completion transmitted by the UAV and the vehicle. The providing of the vehicle or the UAV with a reward may include checking the cooperation completion that is transmitted after landing of the UAV on the vehicle.

The selecting of the vehicle may include calculating a cost of the UAV to land on the vehicle and hitchhike (e.g., travel on the vehicle without using any of own power). The selecting of the vehicle may include setting an order of priority to each cooperation route based on a required time and a number of transfers. The selecting of the vehicle may include setting an order of priority to each cooperation route based on a required time and a predetermined error range. The UAV may land on the vehicle to charge a battery provided in the vehicle. The UAV may land on the vehicle to deliver an article provided in the UAV. The cooperation method may further include classifying, by the control center, classifying a type of the article.

BRIEF DESCRIPTION OF THE DRAWINGS

These and/or other aspects of the invention will become apparent and more readily appreciated from the following description of the embodiments, taken in conjunction with the accompanying drawings of which:

FIGS. 6 and 7 are detailed views for describing a method of selecting a cooperative vehicle according to an exemplary embodiment.

DETAILED DESCRIPTION

Figure 1:
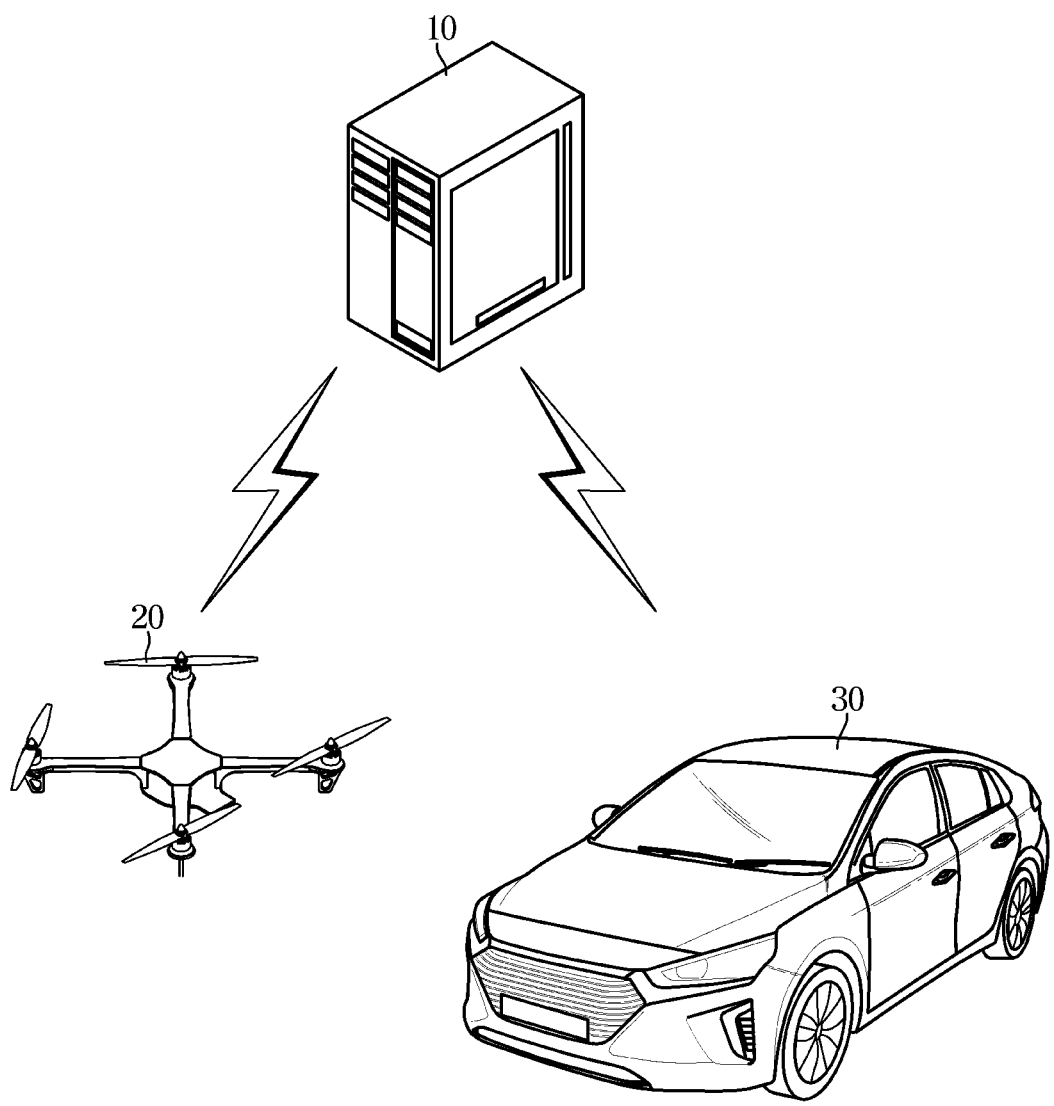
FIG. 1 is a view illustrating a system having an unmanned aerial vehicle (UAV) according to an exemplary embodiment.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although the exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Like numerals refer to like elements throughout the specification. Not all elements of embodiments of the present disclosure will be described, and description of what are commonly known in the art or what overlap each other in the embodiments will be omitted. The terms as used throughout the specification, such as "~ part", "~ module", "~ member", "~ block", etc., may be implemented in software and/or hardware, and a plurality of "~ parts", "~ modules", "~ members", or "~ blocks" may be implemented in a single element, or a single "~ part", "~ module", "~ member", or "~ block" may include a plurality of elements.

It will be further understood that the term "connect" or its derivatives refer both to direct and indirect connection, and the indirect connection includes a connection over a wireless communication network. Although the terms "first," "second," "A," "B," etc. may be used to describe various components, the terms do not limit the corresponding components, but are used only for the purpose of distinguishing one component from another component. Reference numerals used for method steps are just used for convenience of explanation, but not to limit an order of the steps. Thus, unless the context clearly dictates otherwise, the written order may be practiced otherwise.

Figure 2:
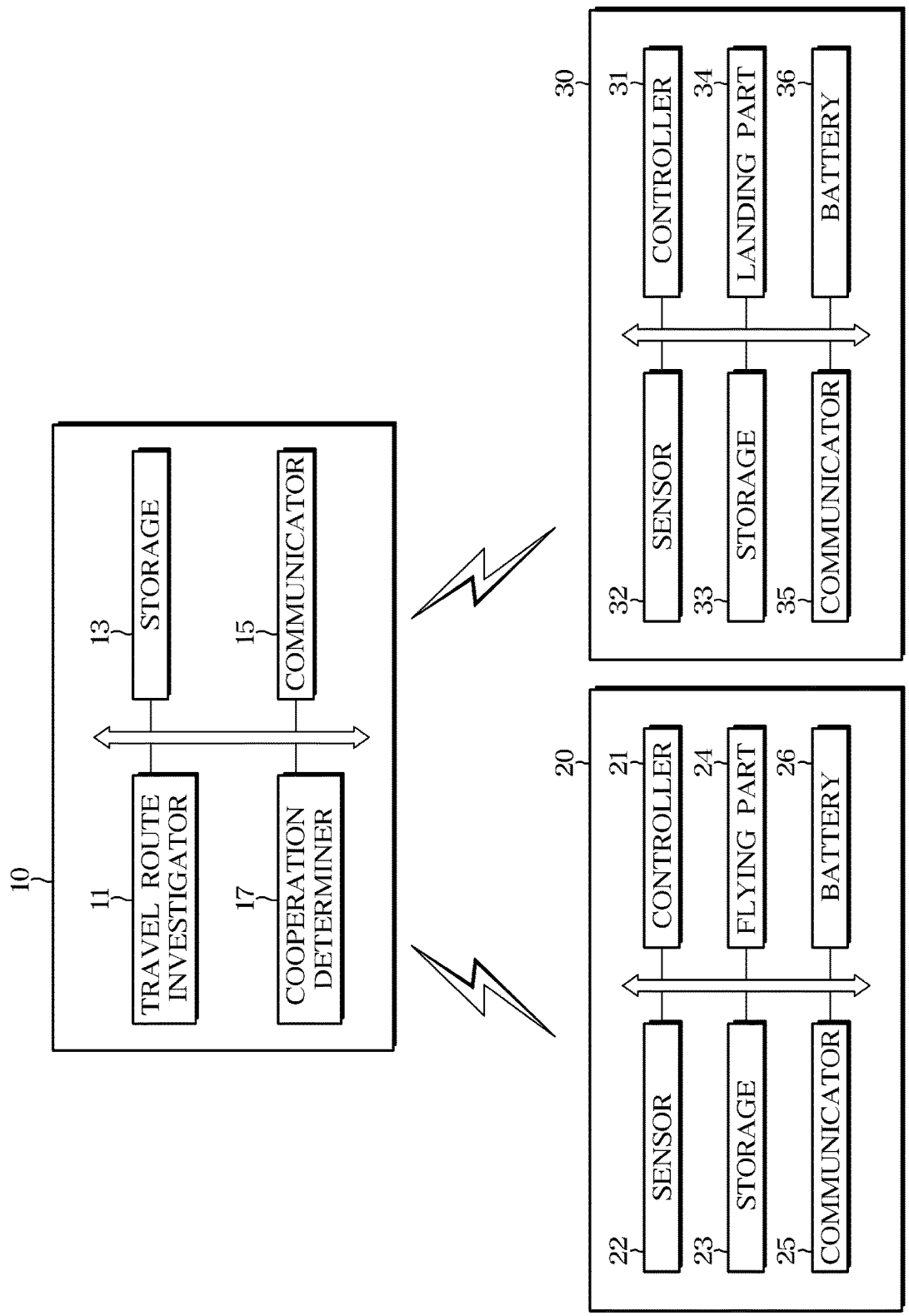
FIG. 2 is a control block diagram illustrating the system according to an exemplary embodiment.

Hereinafter, the operating principles and embodiments of the present disclosure will be described with reference to the accompanying drawings. FIG. 1 is a view illustrating a system having an unmanned aerial vehicle (UAV) according to an exemplary embodiment, and FIG. 2 is a control block diagram illustrating the system. To avoid redundant descriptions, FIGS. 1 and 2 will be described together.

The system may include the vehicle 30, the UAV 20, and the control center 10 configured to perform communication with the UAV 20. The vehicle 30 travels on a road by operating vehicle wheels to transport a human or cargo. In particular, the vehicle 30 may include a sensor 32 configured to sense various circumstances including the UAV 20, a storage 33 configured to store data collected by the sensor 32 and algorithm used to operate the vehicle 30, a landing part 34 (e.g., a landing pad or hub) including a device used for taking off or landing of the UAV 20, a communicator 35 configured to perform wired or wireless communication with the UAV 20 and the control center 10, a battery 36 configured to provide power, and a controller 31 configured to operate the above described components and various devices of the vehicle 30.

Particularly, the sensor 32 may be configured to collect various types of information, and sense an approach of the UAV 20 or nearby vehicles. In addition, the sensor 32 may be configured to collect various types of information inside of the vehicle 30. The vehicle 30 may be configured to transmit global positioning system (GPS) information collected by the sensor 32 to the control center 10 and the UAV 20 via the communicator 35. The control center 10 may be configured to identify the current position of the vehicle 30 using the GPS information, and select a vehicle to be hitchhiked by the UAV 20. The term hitchhike refers to the UAV being capable of travel on the vehicle without consuming power. The UAV 20 may be configured to perform landing based on the GPS information transmitted by the vehicle 30.

The storage 33 may be configured to store various types of data. In particular, the storage 33 may be configured to store information regarding a destination of the vehicle 30 and a travel route on which the vehicle 30 is being driven, and transmit the information to the control center 10 via the communicator 35. The control center 10 may then be configured to select the vehicle 30 on which landing of the UAV 20 is to be performed based on the destination and the travel route of the vehicle 30. The landing part 34 may include a docking device for a safe landing of the UAV 20. In particular, the landing part 34 may include a seating device having a body on which legs of the UAV 20 may be docked. The body of the landing part 34 may have an inclination to reduce the shock that is absorbed when the UAV 20 is landing.

The communicator 35 may be configured to perform machine to machine (M2M) communication with the UAV 20 to execute the landing of the UAV 20. In particular, the control center 10 may be configured to transmit M2M communication information regarding the vehicle 30 to be hitchhiked, and the UAV 20 may be configured to perform the landing based on the received M2M communication information. The vehicle 30 may be configured to permit landing of the UAV 20 based on the M2M communication information. In addition, the communicator 35 may also be configured to communicate with the control center 10 and nearby vehicles via vehicle to everything (V2X) communication, and transmit information regarding the current destination and the current travel route via V2X communication. The communicator 35 may be configured to receive a cooperation request transmitted from the control center 10. The cooperation request may be converted into a cooperation approval signal based on a user's approval, and then may be transmitted back to the control center 10.

The communicator 35 may be configured to transmit information regarding cooperation to the control center 10 in real time even while the UAV 20 is travelling after hitchhike of the vehicle 30. The battery 36 may be configured to provide power to various electronic devices mounted within the vehicle 30. In addition, when the vehicle 30 according to the exemplary embodiment is an electric vehicle, the battery 36 may be configured to provide power to an electric motor to provide power to drive the vehicle 30.

According to the exemplary embodiment, the battery 36 may be charged with power received from the UAV 20 upon hitchhiking on the vehicle 30, and the control center 10 may be configured to receive information regarding such a cooperation and provide a user of the UAV 20 with a reward. In addition, the vehicle 30 may include various other components required for operating the vehicle 30 and servicing the user.

The UAV 20 may include a sensor 22 configured to collect information regarding a surrounding circumstance of the UAV 20, a storage 23 configured to store travel routes and various types of data, a flying part 24 configured to execute take off, flight, posture control, and landing of the UAV 20, a battery 26 configured to supply electric power to each component including the flying part 24, a communicator 25 configured to communicate with the control center 10 or the vehicle 30, and a controller 21 configured to operate each of the above-described components.

Particularly, the sensor 22 may include various sensors configured to sense the surrounding circumstance or environment of the UAV 20 and the state of the UAV 20, and acquire information regarding the travel of the UAV 20. For example, the sensor 22 may include an image sensor configured to photograph a surrounding circumstance, a radar sensor or an ultrasonic sensor configured to sense a surrounding object located on the travel route, a gyro sensor configured to adjust the posture, and an acceleration sensor or angular velocity sensor related to the travel of the vehicle.

In addition, the UAV 20 may include a global positioning system (GPS) sensor configured to determine the position of the UAV 20 on the travel route. The flying part 24 may include various devices for a flight of the UAV 20. For example, the flying part 24 may be implemented in the form of a multi-copter including a rotary wing to perform vertical takeoff and landing, such as a dual copter, a tri-copter, a quad copter, or an octo-copter. In addition, the flying part 24 may include both a hardware device and a software device for control according to the above described various forms.

The respective components of the flying part 24 and the UAV 20 may be operated by receiving power from the battery 26. The battery 26 may be provided in the UAV 20 to allow the UAV 20 to receive power even during flight. The battery 26 may be configured to transmit information regarding the remaining charge amount to the controller 21, and the controller 21 may be configured to transmit information regarding the capacity of the battery 26 including the remaining charge amount to the control center 10 via the communicator 25. The control center 10 may then be configured to transmit the information regarding the remaining charge amount of the battery 26 to the vehicle 30 adjacent to the UAV 20, and allow charging of the battery 26 to be performed through landing.

Meanwhile, the communicator 25 provided in the UAV 20 and the communicator 35 provided in the vehicle 30 may each include a communication module for communication with the outside including the control center 10. In particular, the communicator 25 provided in the UAV 20 and the communicator 35 provided in the vehicle 30 may each include at least one of a wireless communication module, a wired communication module, and a short range communication module. The wireless communication module may be include a WiFi module, a wireless broadband (WIBRO) module, a global system for mobile (GSM) communication module, a code division multiple access (CDMA) module, a wideband code division multiple access (WCDMA) module, a time division multiple access (TDMA) module, a long term evolution (LTE) module, and other wireless communication modules that support various wireless communication methods.

The wireless communication module may include a communication port for connecting the network and the controller 21, a transmitter configured to transmit the state or flight related information of the UAV 20, and a receiver configured to receive information transmitted from the control center 10, another UAV 20, or the vehicle 30. The wireless communication module may further include a signal conversion module configured to modulate a digital control signal output from the controller 21 into an analog wireless signal through a wireless communication interface and demodulate the analog wireless signal received through the wireless communication interface into a digital control signal under the operation of the controller 21.

The short-range communication module may include various short range communication modules for transmitting and receiving signals using a wireless communication network, for example, a Bluetooth module, an infrared communication module, an Radio Frequency Identification (RFID) communication module, a Wireless Local Access Network (WLAN) communication module, an NFC communication module, a Zigbee communication module, and the like.

The wired communication module may include various wired communication modules, such as a controller area network (CAN) communication module, a local area network (LAN) module, a wide area network (WAN) module, or a value added network (VAN) module, and various cable communication modules, such as universal serial bus (USB), high definition multimedia interface (HDMI), and digital visual interface (DVI), and the wired communication module may be used to connect to the vehicle 30 or other configurations after the landing of the UAV 20. The communicator 25 provided in the UAV 20 and the communicator 35 provided in the vehicle 30 may be configured to receive GPS signals from at least three GPS satellites, and calculate the current position of the UAV 20 based on the GPS signals and map data.

Meanwhile, the communicator 25 may be configured to receive a travel route of the UAV 20 which is received from the control center 10. In addition, the communicator 25 may be configured to transmit, to the control center 10, information acquired by the sensor 22, for example, an image acquired by the image sensor or flight-related information of the UAV 20 and surrounding related information that are sensed by other sensors. The storage 23 may be configured to store information regarding the travel route received by the communicator 25 from the control center 10, and provide the controller 21 with the travel route for flight of the UAV 20.

In addition, the storage 23 may be configured to store various types of information collected by the sensor 22 and transmit the information to the control center 10 via the communicator 25. The storage 23 refers to a storage medium included in the UAV 20, but is not limited thereto. For example, the storage 23 may be an external memory separate from the UAV 20.

The storage 23 provided in the UAV 20 and the storage 33 in the vehicle 30 may be implemented as at least one of a nonvolatile memory device, such as a cache, a read only memory (ROM), a programmable ROM (PROM), an erasable programmable ROM (EPROM), an electrically erasable programmable ROM (EEPROM), and a flash memory; a volatile memory device, such as a random access memory (RAM); or other storage media, such as a hard disk drive (HDD), a CD-ROM, and the like. However, the storages 23 and 33 according to the present disclosure are not limited thereto.

Moreover, the controller 21 may be configured to execute the overall operation of the UAV 20. In particular, the controller 21 may be configured to execute operation of the UAV 20, for example, take-off, flight, and posture control, as well as operate the flying part 24 to land on a vehicle located on a vehicle hitchhike route included in a travel route and travel together with the vehicle. In addition, the controller 21 may be configured to communicate with the control center 10 to provide the information regarding the departure and the destination of the UAV 20, and operate the flying part 24 according to a travel route transmitted by the control center 10.

The controller 21 may further be configured to search for or determine a detailed route among final travel routes transmitted by the control center 10 based on the information regarding the surrounding circumstance collected by the sensor 22, and transmit the information regarding the surrounding circumstance collected by the sensor 22 to the control center 10. The controller 21 may be configured to receive information regarding a vehicle to be hitchhiked from the control center 10, approach the vehicle 30 for which an approval request is completed, and attempt a landing on the vehicle 30. In addition, the controller 21 may be configured to transmit, to the control center 10, information regarding the vehicle 30 landed by the UAV 20 for hitchhike.

Meanwhile, the controller 21 may include a memory (not shown) for storing data regarding an algorithm for executing the operations of the components of the UAV 20 or a program that represents the algorithm, and a processor (not shown) that performs the above described operations using the data stored in the memory. At this time, the memory and the processor may be implemented as separate chips. Alternatively, the memory and the processor may be implemented as a single chip. The control center 10 may be configured to monitor the UAV 20 and the vehicle 30 in real time to control the cooperation of the UAV 20 and the vehicle 30.

In particular, the control center 10 may include a travel route investigator 11 configured to search for an optimal route to travel from the destination based on the information regarding the departure and the destination transmitted from the UAV 20, a storage 13 configured to store various types of data, a communicator 15 configured to communicate with the UAV 20 and the vehicle 30, and a cooperation determiner 17 configured to transmit a cooperation request to a plurality of vehicles 30 positioned on the determined travel route and select a final cooperative vehicle.

The communicator 15 may be configured to collect various types of data from various external configurations in addition to the UAV 20 and the vehicle 30, and transmit the travel route determined by the travel route investigator 11 to the UAV 20. In addition, the communicator 15 may also be configured to transmit a cooperation request transmitted from the cooperation determiner 17 to the UAV 20 and the vehicle 30, and receive information regarding an approval of the cooperation request. The data collected by the communicator 15 of the control center 10 may include real-time information, such as traffic information of the vehicle 30, accident information on the road, weather information, and the like and may also include real-time data transmitted by the sensor 22 of the UAV 20.

The storage 13 may be configured to store geographical information including at least one of map information, altitude information regarding flight, vehicle or pedestrian road link information, and terrain feature information, and store the information regarding the departure and the destination transmitted by the UAV 20, the current position information transmitted by the vehicle 30, and data regarding a cooperation approval. In addition, the storage 13 may include the geographical information, and may also include information regarding flight regulations and flight prohibited areas, safety guidelines for the UAV 20, information regarding the capacity of the battery 26, and information regarding a reward provided to the vehicle 30 and 20 that participate in the cooperation.

The travel route investigator 11 may be configured to search for travel routes based on the departure and destination information to determine a travel route in which a hitchhike of the vehicle 30 is to be performed, and transmit a plurality of travel routes using geographical information to the cooperation determiner 17. In particular, the travel route investigator 11 may be configured to detect a point at which take-off or landing of the UAV 20 is to be performed among the plurality of travel routes using the flight prohibited areas of the geographical information, the amount of battery consumption, and road information of a road to be transmitted the vehicle 30.

The cooperation determiner 17 may be configured to collect information regarding the vehicle 30 that is located or to be located on the plurality of travel routes including various types of geographical information. The cooperation determiner 17 may be configured to identify the vehicle 30 on which hitchhike of the UAV 20 is to be performed based on the collected information. The cooperation determiner 17 may be configured to transmit a cooperation request to the identified vehicle 30 and select an optimal vehicle 30 that is to be landed by the UAV 20 among the vehicles 30 having approved the cooperation. The cooperation determiner 17 may additionally be configured to transmit information regarding the selected vehicle 30 to the UAV 20. The control center 10 may be configured to determine a reward for the UAV 20 or the vehicle 30 that has completed the cooperation, based on a reward rule stored in the storage 13. The rewards may be a specific affiliated store that provides a point available similar to cash as a reward, but the present invention is not limited thereto.

A method of selecting a vehicle or a UAV to perform cooperation by the control center 10 will be described below in detail with reference to other drawings. Meanwhile, although the above described embodiment has been made in relation that the vehicle 30 is an agent that approves the cooperation, the present disclosure is not limited thereto. For example, the present disclosure may also be applied to the UAV 20 that approves a cooperation request of the vehicle 30. In addition, although the cooperation method of the control center 10 is described as being separated from the configuration of the travel route investigator 11 for the sake of convenience in description, the cooperation method may be selected based on information collected by a single processor.

Figure 3:
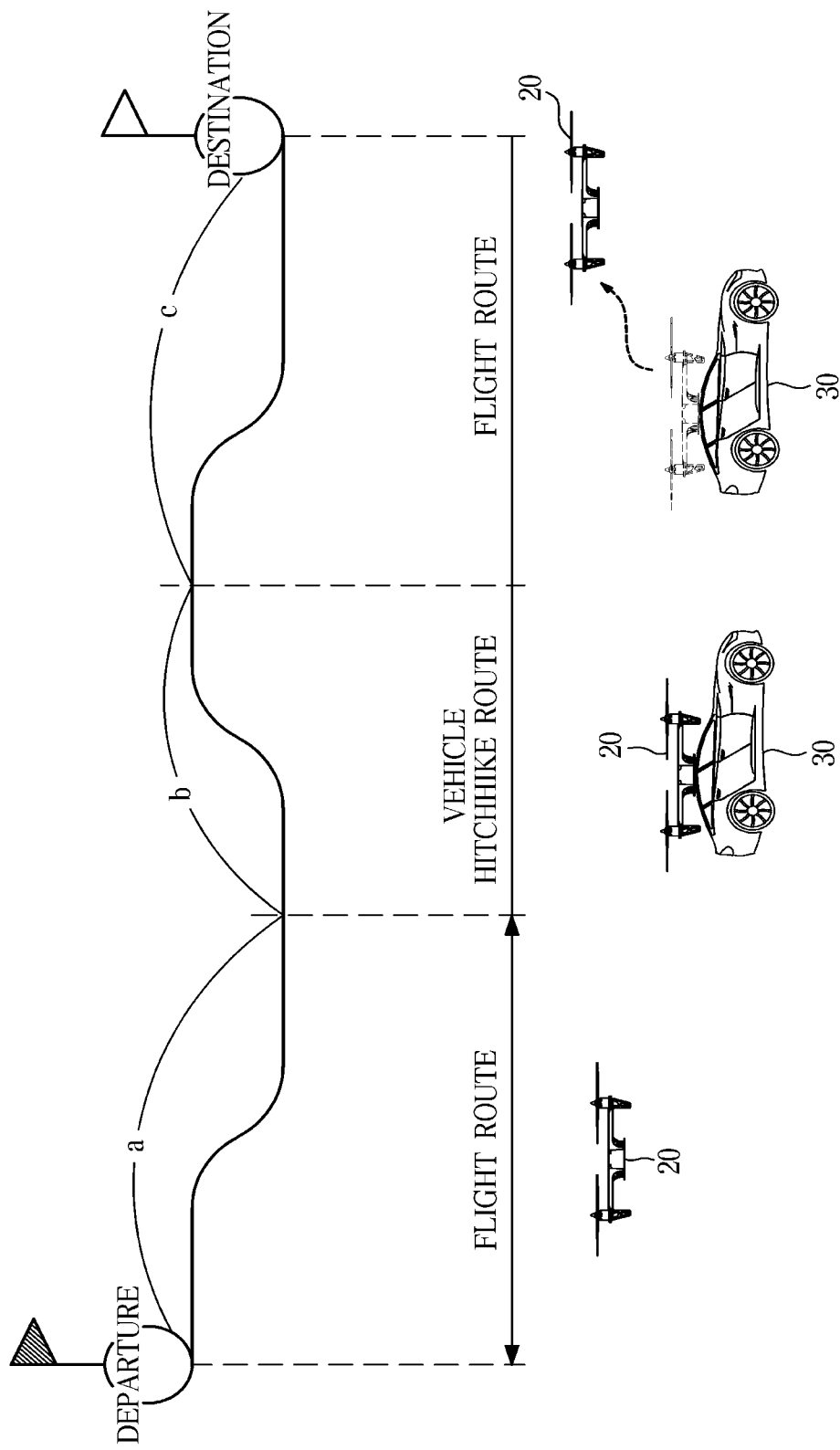
FIG. 3 is a conceptual view illustrating a vehicle hitchhike travel of a UAV according to an exemplary embodiment.

FIG. 3 is a conceptual view illustrating a vehicle hitchhike travel of the UAV according to the exemplary embodiment. Referring to FIG. 3, the UAV 20 lands on a vehicle 30 located in a vehicle hitchhike route b among final travel routes a, b, and c received from the control center 10 to arrive at a destination, and travels together with the vehicle 30.

The UAV 20 travels a flight route (section a) by flying, and then may travel the vehicle hitchhike route (section b) by landing on the vehicle 30 having approved the cooperation. Further, the UAV 20 may travel a flight route (section c) that starts from an ending point of the vehicle hitchhike route by taking off from the vehicle 30, and flying to the destination. On a road that corresponds to a route among flight routes, the UAV 20 may land on the vehicle 30 moving in a direction toward the destination and travel together with the vehicle 30. The UAV 20 may be configured to monitor and search the surroundings using the sensor 22 and detect whether the vehicle 30 determined to approve the cooperation is located on the vehicle hitchhike route (section b). The UAV 20 may be configured to communicate with the vehicle 30 via the communicator 25 and perform takeoff or landing.

Figure 4:
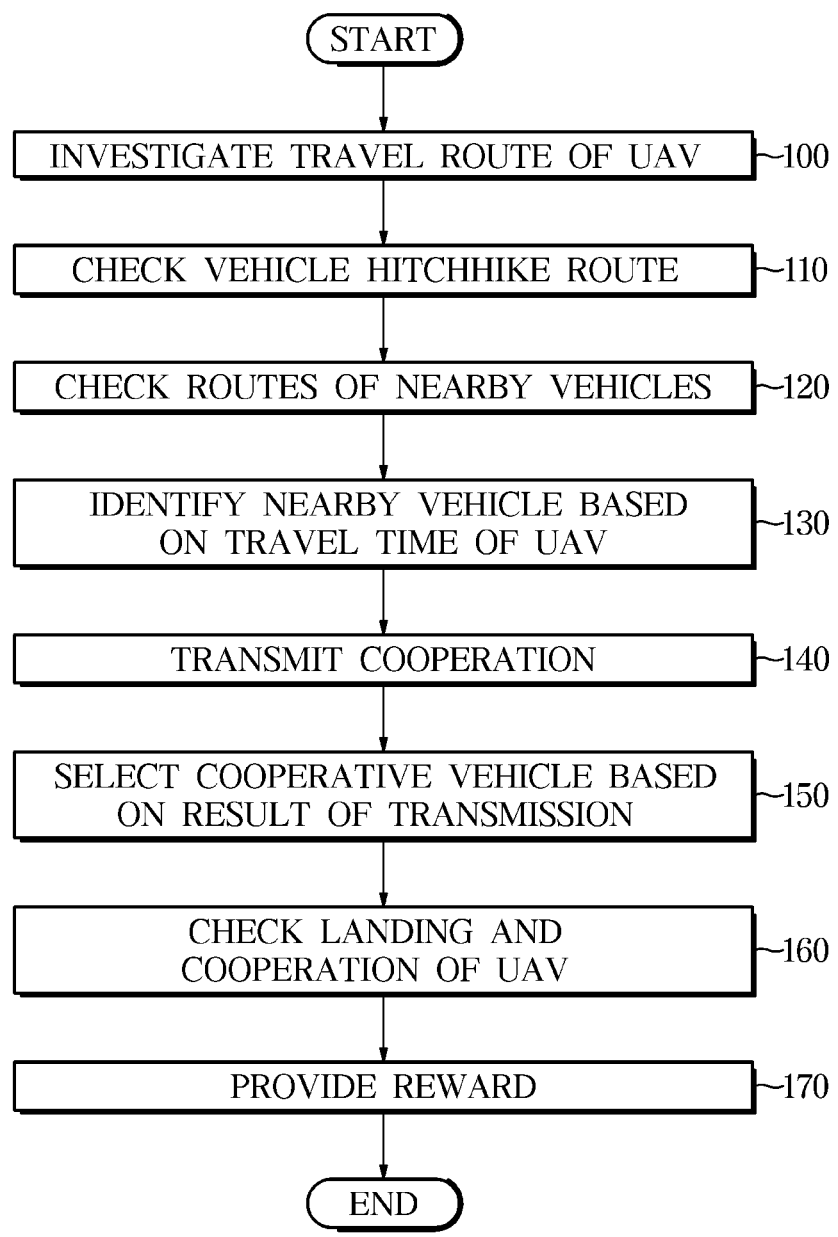
FIGS. 4 and 5 are views showing a method of selecting a cooperation method according to an exemplary embodiment.
Figure 5:
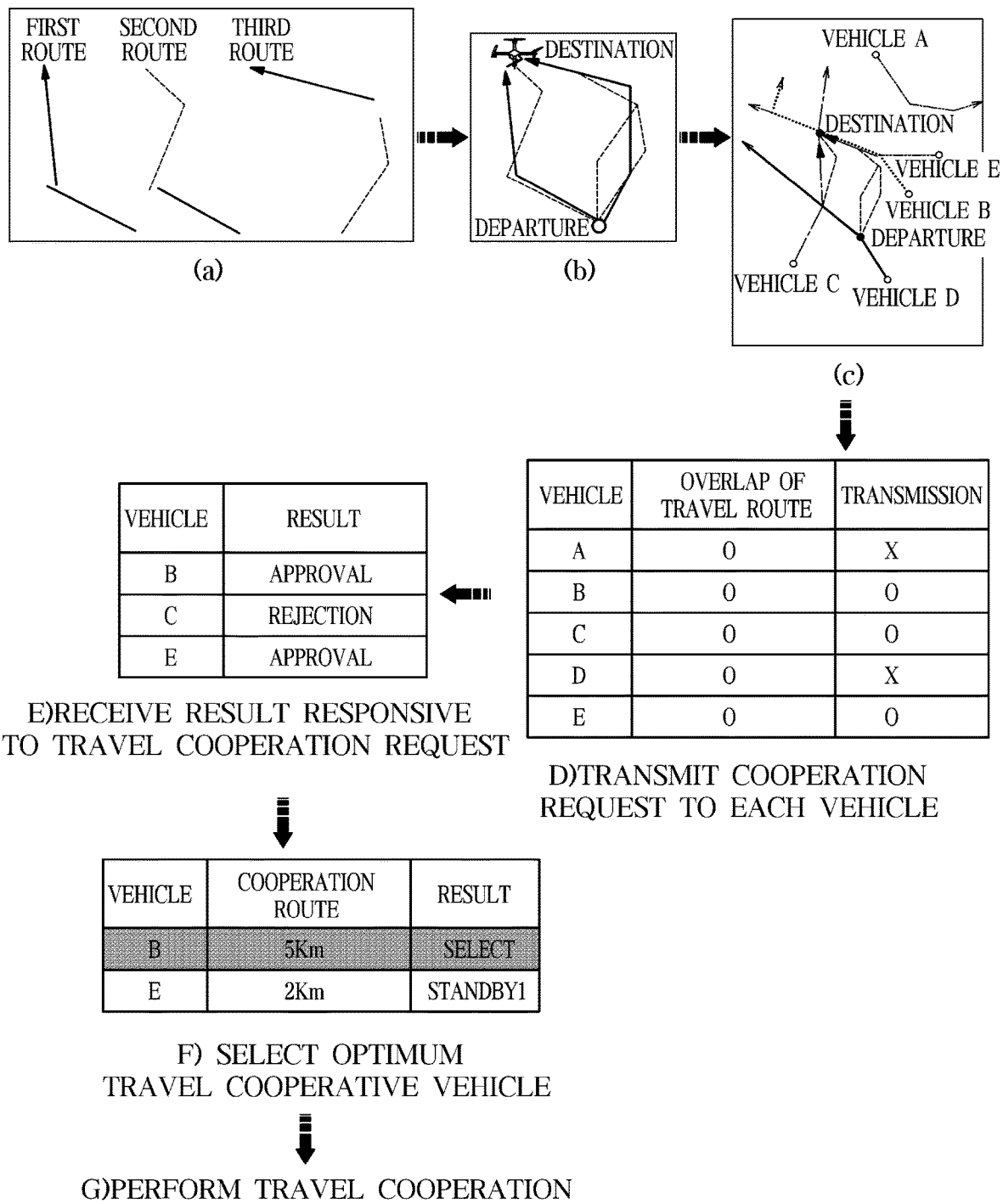

FIGS. 4 and 5 are views showing a method of selecting a cooperation method according to an exemplary embodiment. To avoid redundant descriptions, FIGS. 4 and 5 will be described together. Referring to FIG. 4, the control center 10 may be configured to search for a travel route of the UAV 20 (100).

In particular, a travel route may be generated by matching a departure and a destination transmitted by the UAV 20 with stored map information. In other words, the control center 10 may be configured to determine the travel route to be a straight line that connects the departure to the destination. However, the travel route may be set as a detour route when a flight prohibited area having high mountains and buildings exists between the departure and the destination.

Referring to FIG. 5, part (a), the control center 10 may be configured to search for a plurality of travel routes that may bypass a flight-prohibited area. A route indicated by a dotted line in each travel route is a flight route, and a route indicated by a solid line in each travel route is a vehicle hitchhike route in FIG. 5, part (a). The control center 10 may be configured to check a vehicle hitchhike route in each travel route (110).

Particularly, the vehicle hitchhike route represents a route in which the UAV 20 travels by landing on the vehicle 30. For example, the vehicle hitchhike route may represent a road travelled by the vehicle 30 in each travel route, and may include both of an area having difficulty in flight and a route easily passed by the vehicle 30. The control center 10 may be configured to distinguish the vehicle hitchhike route from the plurality of travel routes, and then determine the plurality of travel routes as shown in FIG. 5, part (b). The control center 10 may further be configured to check routes of nearby vehicles that are to be included in the plurality of travel routes (120).

Referring to FIG. 5, part (c), the control center 10 may be configured to collect information regarding a current position, a destination, and a travel route from nearby vehicles A to E, and compare the collected information with the vehicle hitchhike route. In particular, the control center 10 may be configured to check that, from the travel routes shown in FIG. 5, part (b), the nearby vehicle A travels in a route that does not overlap the vehicle hitchhike route, the nearby vehicles B and E travel in routes overlapping the third travel route, and the nearby vehicles C and D travel in routes overlapping the first and second travel routes.

The control center 10, after checking of the travel routes, identifies a nearby vehicle on the basis of a travel time transmitted by the UAV 20 (130). For example, the nearby vehicle D travels in a route that overlaps the first travel route and the second travel route, but may not have a travel time that matches that of the UAV 20. The control center 10 may be configured to exclude the nearby vehicle D that does not have a travel time that matches that of the UAV 20. The control center 10 may be configured to transmit a cooperation request to the nearby vehicles B, C, and E having the travel routes that overlap the travel route of the UAV (140).

Referring to FIG. 5, part (d), the control center 10 may be configured to transmit a cooperation request to the nearby vehicles B, C, and E using a list generated based on the above-described determination. The control center 10 may be configured to select a cooperative vehicle based on a result responsive to the cooperation request transmission (150).

As an example, only the nearby vehicles B and E among the nearby vehicles B, C, and E having received the cooperation request may approve the cooperation. The control center 10 may be configured to calculate a required time based on at least one of the vehicle hitchhike route with respect to the nearby vehicles B and E, the flight distance of the UAV, and the number of transfers, and select the optimum cooperative vehicle based on the calculated required time and the approval result, as the nearby vehicle B among the nearby vehicles B and E.

Referring to FIG. 5, part (f), the control center 10 may be configured to select the nearby vehicle B as the cooperative vehicle and maintain the other vehicle E in a standby state. The control center 10 may be configured to provide a reward, in response to detecting a completion of the landing and cooperation of the UAV (160 and 170). Referring to FIG. 5, part (g), the control center 10, after selecting the cooperative vehicle B, may be configured to monitor whether the cooperative vehicle B performs cooperation with the UAV 20 in real time. The control center 10 may be configured to provide the reward in response to detecting and receiving a signal regarding the completion of the cooperation from the cooperative vehicle B and the UAV 20.

Figure 6:
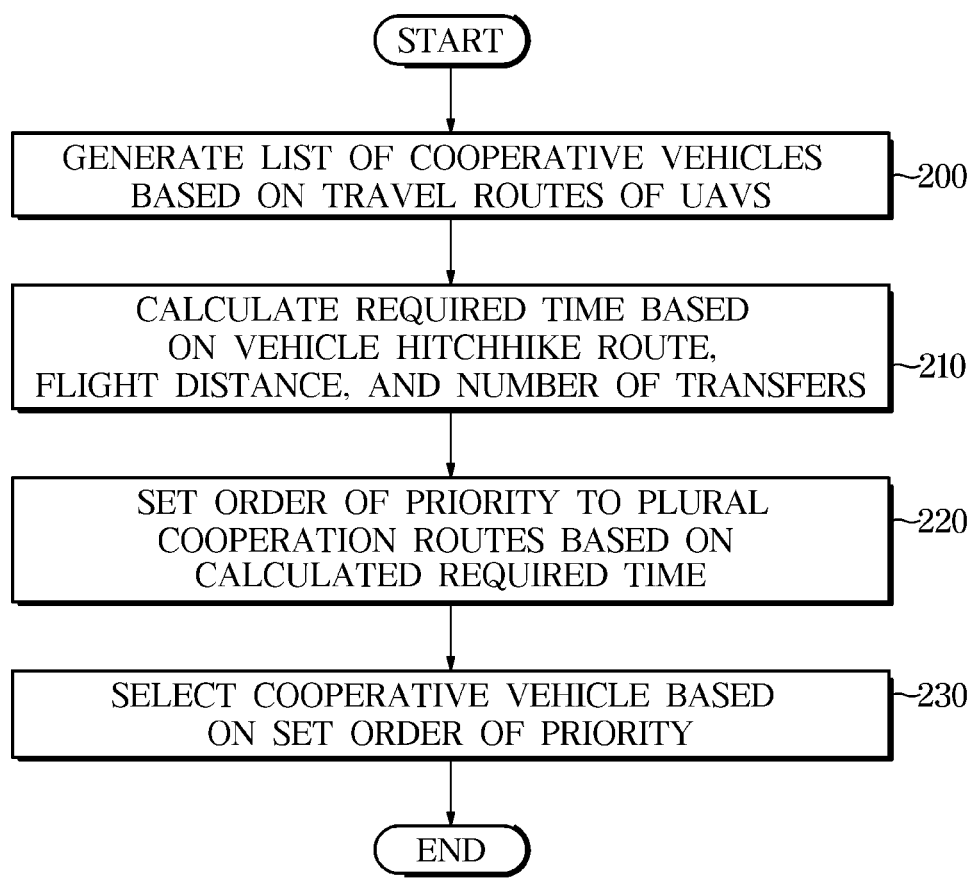

FIGS. 6 and 7 are detailed views for describing a method of selecting a cooperative vehicle. To avoid redundancy, FIGS. 6 and 7 will be described together. First, referring to FIG. 6, the control center 10 may be configured to generate a list of cooperative vehicles based on travel routes of the UAV 20 (200).

As described above with reference to FIGS. 4 and 5, when routes of nearby vehicles overlapping the travel routes of the UAV 20 are detected, the control center 10 may be configured to transmit a cooperation request to the nearby vehicles. The control center 10 may be configured to generate the list as shown in FIG. 7 only for the nearby vehicles that have approved the cooperation.

The list shown in FIG. 7 includes all possible cooperation routes that may be generated based on the travel routes of the nearby vehicle having approved the cooperation and the travel routes of the UAV 20. For example, when a plurality of vehicles are present in the vehicle hitchhike route, the vehicle hitchhike route may be diversified based on the travel route of each vehicle. The control center 10 may be configured to generate the list such that the various vehicle hitchhikes are included in the cooperation routes. The control center 10 may be configured to calculate the required time based on the vehicle hitchhike route, the flight distance, and the number of transfers (210).

Referring to FIG. 7, the first cooperation route may have a vehicle hitchhike section of 8 km and a flight distance of 4 km, and have a single transfer. In contrast, the second cooperation route may have a vehicle hitchhike section of 4 km with a flight time greater than that of the first cooperation route, thereby resulting in a longer required time. Accordingly, the control center 10 may be configured to calculate the required times for the respective cooperation routes in various cases. The control center 10 may be configured to set an order of priority to the plurality of cooperation routes based on the calculated required time (220). For example, the control center 10 may be configured to set a high order of priority to the first cooperation route, which is determined to have the minimum required time and the minimum number of transfers from the list shown in FIG. 7.

As another example, the control center 10 may be configured to set a high order of priority to the third cooperation route as an optimal complex route. Particularly, the optimal complex route represents a strategic route in which when the flight time is accounted for, the required time is within a predetermined range, as in the third cooperation route in which the required time has an error range falling within a predetermined range even with the number of transfers and the required time minimally greater than those of the first cooperation route 1. In other words, when travelling the same travel distance, the third cooperation route has a long vehicle hitch distance while having a flight distance significantly shorter than that of the first cooperation route as shown in FIG. 7.

In other words, the control center 10 may be configured to prioritize a cooperation route with a minimum required time or a cooperation route that corresponds to an optimal complex route among the cooperation routes. The control center 10 may be configured to select a cooperative vehicle based on the set order of priority (230). The selecting of a cooperative vehicle may be performed based on the order of priority. However, the control center 10 may be configured to set the order of priority through various methods other than using the minimum required time and the optimal complex route as described above, and the cooperation route may be set through various methods that may be changed by a person skilled in the art.

Figure 8:
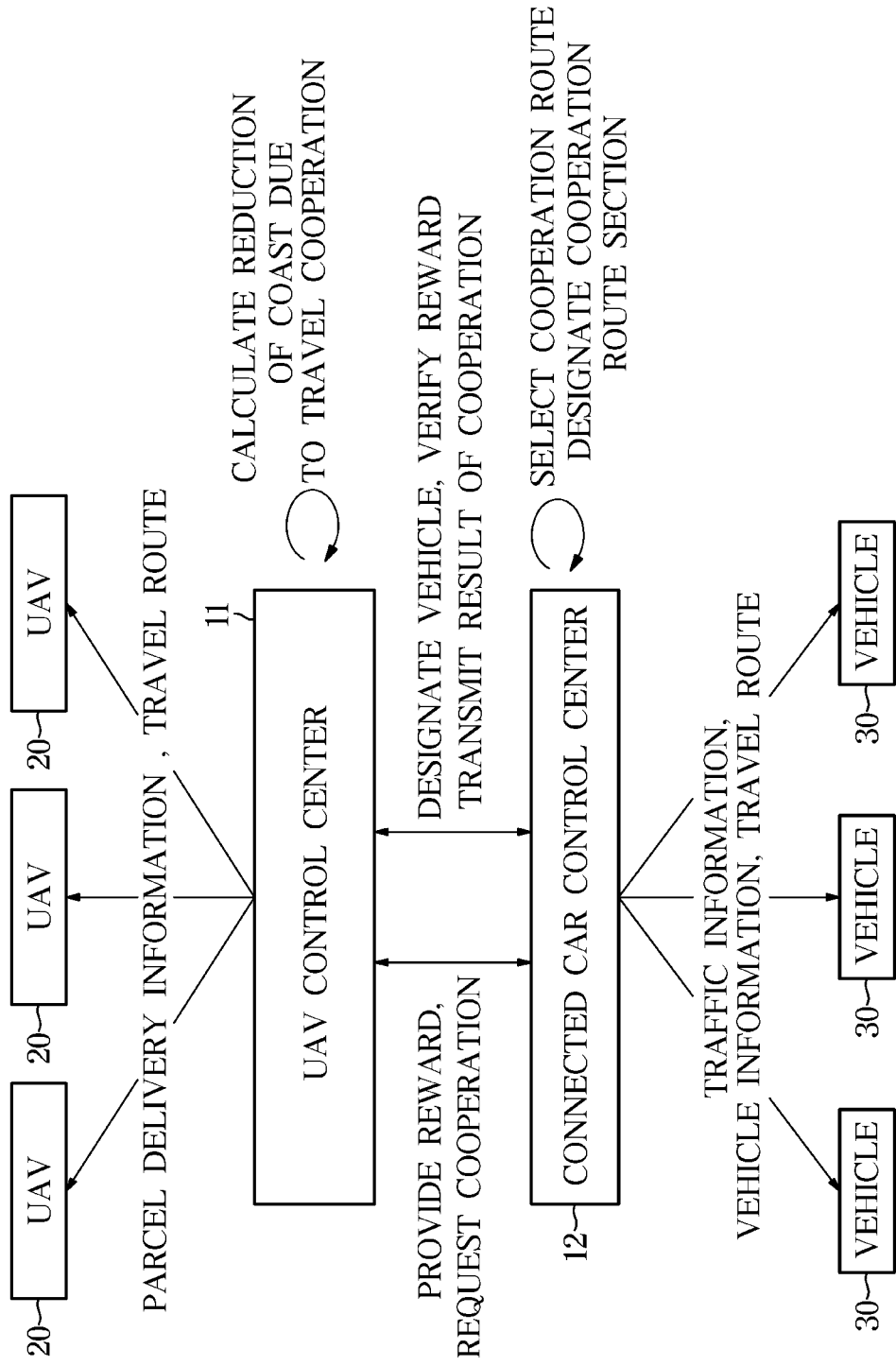
FIGS. 8 to 10 are views for describing cooperation methods according to various exemplary embodiments.
Figure 9:
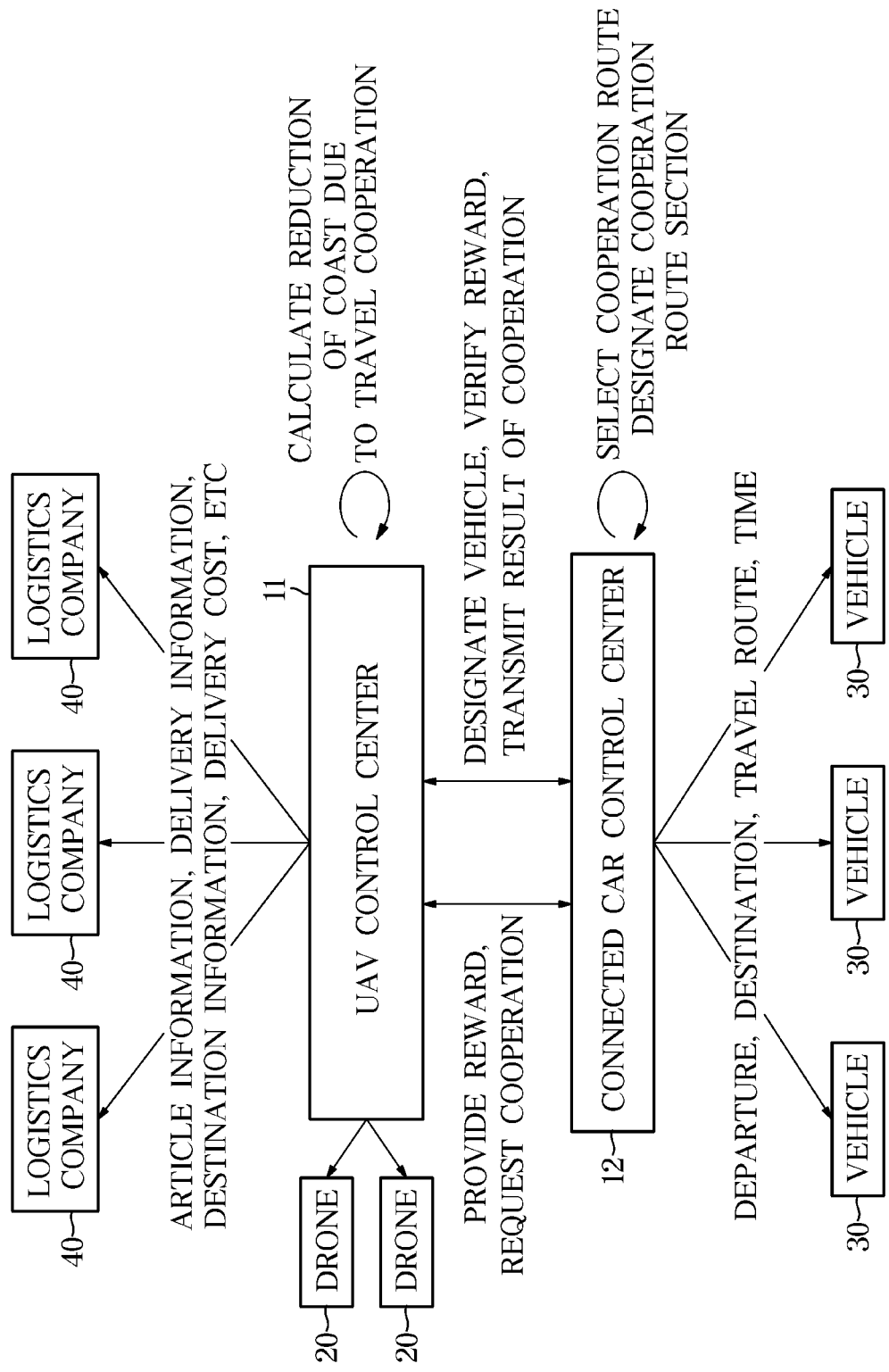
Figure 10:
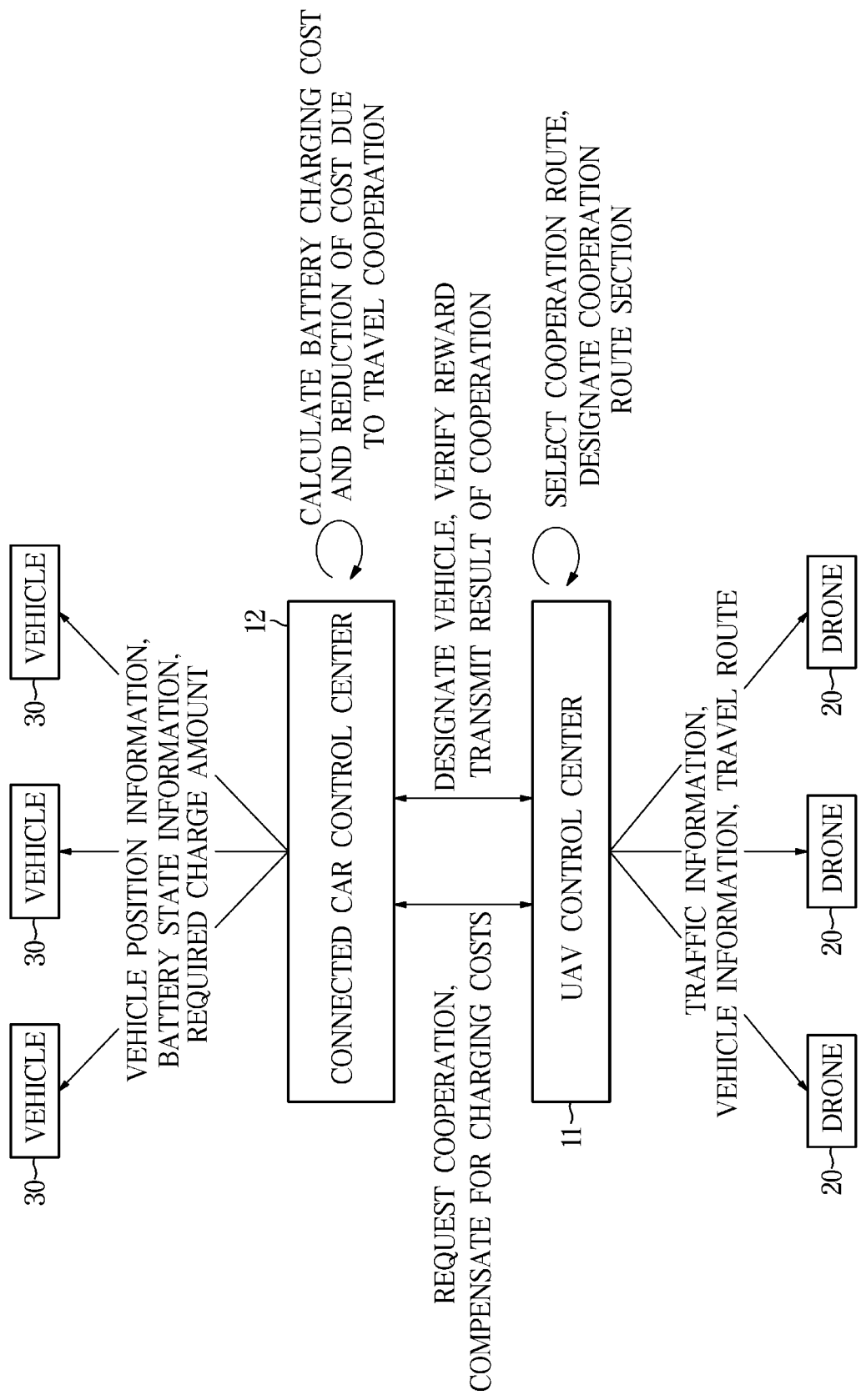

FIGS. 8 to 10 are views for describing cooperation methods according to various exemplary embodiments. To avoid redundant descriptions, FIGS. 8 to 10 will be described together. The cooperation method may be applied to industrial fields through various methods which will be described below. In addition, synergies generated by the cooperation may be adjusted to share the benefits through a predetermined reward system.

Referring to FIG. 8, a UAV control center 11 may be configured to transmit parcel delivery information and a travel route of the UAV 20 to each of the UAVs 20. The UAV 20 may be configured to determine a destination and a departure based on the received information, and transmit information regarding the travel route to the UAV control center 11. The UAV control center 11 may be configured to determine a cooperation in which cost reduction is performed, from the route that is transmitted from each of the UAV 20. The UAV control center 11 may be configured to transmit a cooperation request for hitch hiking a determined vehicle, to a connected vehicle control center 12.

The connected vehicle control center 12 may be configured to determine a vehicle 30 included in a travel route in which cooperation is to be performed. In particular, the connected vehicle control center 12 may be configured to receive real-time traffic information and travel route information from the vehicle 30. The connected vehicle control center 12 may be configured to determine a cooperation route in which the UAV 20 hitch hikes the vehicle 30 through the method described above with reference to FIG. 3 to FIG. 7 in response to the cooperation request, and transmit information regarding the cooperation route to the UAV control center 11.

The UAV control center 11 may be configured to transmit the determined cooperation route and vehicle information according to a set order of priority to each of the UAVs 20, and may be configured to instruct execution of a cooperation. When the cooperation is completed, the connected vehicle control center 12 may be configured to provide a reward to the vehicle 30 according to stored reward rules. Meanwhile, the UAV control center 11 and the connected vehicle control center 12 are types of control centers 10 classified for the sake of convenience in description. In other words, the control center 10 may be implemented in various forms, for example, as a server capable of controlling communication and management. For example, the UAV control center 11 and the connected vehicle control center 12 may be physically combined and operate as a single control center, unlike FIG. 8.

Referring to FIG. 9, the UAV control center 11 may be configured to perform cooperation with logistics companies 40 according to the exemplary embodiment described above with reference to FIG. 8. In other words, each of the logistics companies 40 may manage the UAV 20 required for a delivery, and the UAV control center 11 may be configured to communicate directly with the UAV 20, or execute the cooperation method through the logistics company 40.

Referring to FIG. 10, a connected vehicle control center 12 according to another exemplary embodiment may be configured to receive a cooperation request for battery charging from an electric vehicle and an autonomous vehicle. The connected vehicle control center 12 may be configured to calculate the power capacity required for battery charging, the charging cost, and the costs to be saved by the cooperation, and may be configured to transmit a cooperation request to the UAV control center 11.

The UAV control center 11 may be configured to receive information regarding a travel route from the UAV 20 and analyze information regarding a travel route of the vehicle 30 and a vehicle hitchhike route that are transmitted by the connected vehicle control center 12. For example, the UAV control center 11 may be configured to check a section in which a landing and hitchhiking of the UAV 20 is to be performed, designate the UAV 20, and transmit information regarding the checked section and the designated UAV 20 to the connected vehicle control center 12. The connected vehicle control center 12 may be configured to transmit, to the vehicle 30 having requested the charging of the battery 36, the information regarding the UAV 20 that have approved the cooperation.

When the UAV 20 lands on the vehicle 30 and completes the cooperation of charging the battery 36, the connected vehicle control center 12 may be configured to communicate with the UAV control center 11 to inform that the cooperation is completed and provide a reward for the charging cost. The UAV control center 11 may be configured to provide the UAV 20 with a reward according to the reward rules.

Accordingly, the system 1 having the UAV 20 and the cooperation method for the same may improve limitations in travelling only by the UAV 20 by performing cooperation between the UAV 20 and the vehicle 30. The cooperation method of the system 1 may process a complex scheduling between the vehicle and the UAV 20, and may be applied to various industries, article delivery, and battery charging. In addition, the cooperation method of the system 1 may effectively reduce the travel distance and the travel time of the UAV 20 through a method of setting the order of priority to various cooperation paths.

As is apparent from the above, the system having the UAV and the cooperation method thereof may remove limitations in travelling only by a UAV by enabling cooperation between a UAV and a vehicle. The system having the UAV and the cooperation method thereof may process complex scheduling between the vehicle and the UAV, and come into wide applications in various industries, such as shipments and battery charge of electric vehicles. The system having the UAV and the cooperation method thereof may reduce the travel distance and the travel time through a complex hitchhiking route with a vehicle.

What is claimed is:

1. A system, comprising:
a plurality of vehicles;
an unmanned aerial vehicle (UAV) configured to land on one of the plurality of vehicles and travel together with the vehicle; and
a control center configured to:
select some vehicles of the plurality of vehicles on which landing of the UAV is to be performed based on travel routes transmitted by the plurality of vehicles and the UAV,
transmit a cooperation request to the some vehicles,
receive an approval of the cooperation request from at least one vehicle among the some vehicles,
generate a plurality of cooperation routes between each of the at least one vehicle and the UAV based on a first travel route of each of the at least one vehicle and a second travel route of the UAV,
calculate a required time of each of the plurality of cooperation routes based on hitchhike routes of the at least one vehicle included in the cooperation routes, a flight distance of the UAV, and a number of transfers of the UAV, and
select one of the at least one vehicle based on a priority determined based on the required time of each of the cooperation routes, the flight distance of the UAV, and a length of each of the hitchhike routes, wherein the selected one of the at least one vehicle corresponds to the required time within a predetermined range.

2. The system of claim 1, wherein the control center is configured to determine whether landing of the UAV is to be performed, based on an approval of the cooperation request.

3. The system of claim 2, wherein the control center is configured to provide the one of the at least one vehicle or the UAV with a reward based on a cooperation completion transmitted by the UAV and the vehicle.

4. The system of claim 1, wherein the control center is configured to search for a plurality of travel routes based on information regarding a departure and a destination of the UAV.

5. The system of claim 4, wherein the control center is configured to determine a plurality of vehicle hitchhike routes based on the plurality of travel routes and a travel route transmitted by each of the plurality of vehicles.

6. The system of claim 1, wherein the control center is configured to set an order of priority to the cooperation route based on the calculated required time and the number of transfers.

7. The system of claim 1, wherein the UAV lands on the one of the at least one vehicle and charges a battery provided in the one of the at least one vehicle.

8. A cooperation method of a system comprising a plurality of vehicles, an unmanned aerial vehicle (UAV) landing on one of the plurality of vehicles and moving together with the vehicle, and a control center performing communication with the vehicles and the UAV, the cooperation method comprising:
selecting, by a controller, some vehicles of the plurality of vehicles on which landing of the UAV is to be performed based on travel routes transmitted by the plurality of vehicles and the UAV;
transmitting, by the control center, a cooperation request to the some vehicles;
receiving an approval of the cooperation request from at least one vehicle among the some vehicles;
generating a plurality of cooperation routes between each of the at least one vehicle and the UAV based on a first travel route of each of the at least one vehicle and a second travel route of the UAV;
calculating a required time of each of the plurality of cooperation routes based on hitchhike routes of the at least one vehicle included in the cooperation routes, a flight distance of the UAV and a number of transfers of the UAV; and
selecting one of the at least one vehicle based on a priority determined based on the required time of each of the cooperation routes, the flight distance of the UAV, and a length of each of the hitchhike routes, wherein the selected one of the at least one vehicle corresponds to the required time within a predetermined range.

9. The cooperation method of claim 8, further comprising determining whether to perform landing of the UAV based on an approval of the cooperation request.

10. The cooperation method of claim 9, further comprising providing the one of the at least one vehicle or the UAV with a reward based on a cooperation completion transmitted by the UAV and the vehicle.

11. The cooperation method of claim 10, wherein the providing of the one of the at least one vehicle or the UAV with a reward comprises checking the cooperation completion that is transmitted after landing of the UAV on the selected vehicle.

12. The cooperation method of claim 9, wherein the selecting of the one of the at least one vehicle comprises setting an order of priority to each cooperation route based on the required time and the number of transfers.

13. The cooperation method of claim 8, wherein the selecting of the vehicle comprises calculating a cost of the UAV to land on the one of the at least one vehicle and hitchhike.

14. The cooperation method of claim 8, wherein the UAV lands on the one of the at least one vehicle to charge a battery provided in the one of the at least one vehicle.

15. The cooperation method of claim 8, wherein the UAV lands on the one of the at least one vehicle to deliver an article provided in the UAV.

* * * * *